United States Patent
Bai et al.

(10) Patent No.: US 11,132,506 B2
(45) Date of Patent: Sep. 28, 2021

(54) SYSTEM AND METHOD FOR SEGMENTING A SENTENCE

(71) Applicant: BEIJING DIDI INFINITY TECHNOLOGY AND DEVELOPMENT CO., LTD., Beijing (CN)

(72) Inventors: Jie Bai, Beijing (CN); Xiulin Li, Beijing (CN)

(73) Assignee: BEIJING DIDI INFINITY TECHNOLOGY AND DEVELOPMENT CO., LTD., Beijing (CN)

(*) Notice: Subject to any disclaimer, the term of this patent is extended or adjusted under 35 U.S.C. 154(b) by 0 days.

(21) Appl. No.: 16/749,956

(22) Filed: Jan. 22, 2020

(65) Prior Publication Data

US 2020/0160000 A1    May 21, 2020

Related U.S. Application Data

(63) Continuation of application No. PCT/CN2017/095305, filed on Jul. 31, 2017.

(51) Int. Cl.
*G06F 40/53* (2020.01)
*G10L 13/10* (2013.01)
(Continued)

(52) U.S. Cl.
CPC .......... *G06F 40/247* (2020.01); *G06F 40/237* (2020.01); *G06F 40/284* (2020.01);
(Continued)

(58) Field of Classification Search
CPC ...... G06F 40/53; G06F 40/284; G06F 40/247; G06F 40/289; G06F 40/30; G10L 13/10
(Continued)

(56) References Cited

U.S. PATENT DOCUMENTS

| 2007/0124301 A1 | 5/2007 | Elbaz et al. |
| 2008/0091407 A1 | 4/2008 | Furihata et al. |

(Continued)

FOREIGN PATENT DOCUMENTS

| CN | 103544309 A | | 1/2014 |
| CN | 103793491 A | * | 5/2014 |

(Continued)

OTHER PUBLICATIONS

Sanjay Chatterji et al., An Effcient Technique for De-Neising Sentences using Monolingual Corpus and Synonym Dictionary, Proceedings of COLING 2012: Demonstration Papers, pp. 59-66, 2012.

(Continued)

*Primary Examiner* — Edwin S Leland, III
(74) *Attorney, Agent, or Firm* — Finnegan, Henderson, Farabow, Garrett & Dunner, L.L.P.

(57) ABSTRACT

Embodiments of the disclosure provide systems and methods for segmenting a sentence. The method may include identifying a first phrase in the sentence associated with a first segmentation path, determining a first group of derivative phrases semantically associated with the first phrase, determining a first evaluation score based on modified sentences generated by replacing the first phrase with the respective derivative phrase in the first group, and segmenting the sentence based on the first evaluation score.

16 Claims, 3 Drawing Sheets

(51) Int. Cl.
  *G06F 40/284* (2020.01)
  *G06F 40/247* (2020.01)
  *G06F 40/289* (2020.01)
  *G06F 40/30* (2020.01)
  *G06F 40/237* (2020.01)

(52) U.S. Cl.
  CPC ............ *G06F 40/289* (2020.01); *G06F 40/30* (2020.01); *G06F 40/53* (2020.01); *G10L 13/10* (2013.01)

(58) Field of Classification Search
  USPC .............................................................. 704/9
  See application file for complete search history.

(56) References Cited

U.S. PATENT DOCUMENTS

| | | | |
|---|---|---|---|
| 2008/0221863 A1* | 9/2008 | Liu | G06F 40/53 704/2 |
| 2012/0078612 A1* | 3/2012 | Kandekar | G06F 3/0482 704/9 |
| 2014/0181109 A1 | 6/2014 | Lin et al. | |
| 2014/0244240 A1 | 8/2014 | Kim et al. | |
| 2015/0100307 A1 | 4/2015 | Sun et al. | |
| 2018/0121394 A1* | 5/2018 | Denoue | H04L 51/02 |
| 2019/0179316 A1* | 6/2019 | Siskind | G05D 1/10 |
| 2020/0159994 A1* | 5/2020 | Bai | G06F 40/20 |

FOREIGN PATENT DOCUMENTS

| | | | | |
|---|---|---|---|---|
| CN | 104464757 A | * | 3/2015 | |
| CN | 104464757 A | | 3/2015 | |
| CN | 103793491 B | | 1/2017 | |
| CN | 103927358 B | | 2/2017 | |
| CN | 106407235 A | | 2/2017 | |
| TW | 201715420 A | | 5/2017 | |
| WO | WO-2019023893 A1 | * | 2/2019 | G06F 40/30 |

OTHER PUBLICATIONS

Georgiana Dinu et al., How Make Words with Vectors: Phrase Generation in Disiributional Semantics, Proceedings of ALC 2014, pp. 624-633, 2014.

The Extended European Search Report in European Application No. 17920149.6 dated Jun. 16, 2020, 9 pages.

International Search Report in PCT/CN2017/095305 dated May 4, 2018, 4 pages.

Written Opinion in PCT/CN2017/095305 dated May 4, 2018, 4 pages.

\* cited by examiner

SYSTEM AND METHOD FOR SEGMENTING A SENTENCE

CROSS-REFERENCE TO RELATED APPLICATIONS

This application is a continuation of International Application No. PCT/CN2017/095305, filed on Jul. 31, 2017, the contents of which are incorporated herein by reference.

TECHNICAL FIELD

The present disclosure relates to Text-to-Speech (TS) techniques, and more particularly, to segmenting a text sentence.

BACKGROUND

Text-to-Speech techniques can transcribe text information into audio signals. For example, in a navigation application (e.g., a DiDi app), text information, such as traffic condition, addresses, or the like may be presented to a user by voice. And books and news may be read to the user as well by means of TS techniques.

To be read in a natural way, a piece of text (e.g., a sentence) must be segmented properly before being transcribed into audio signals. Generally, each of the phrases that are included in a sentence contains one or more words. Consistent with this disclosure, a word can be an English, French, Spanish, etc. word in the Latin language, or a character in Asian languages such as Chinese, Korean, Japanese, etc. These words or characters may be segmented into phrases in a plurality of possible combinations. In Example I, a sentence "The man over there is watching TV" may be segmented according to two segmentation paths as below:

A first segmentation path: "The man/ over/ there is/ watching TV".

A second segmentation path: "The man/ over there/ is/ watching TV".

When the audio signals are generated based on the first segmentation path, the transcription may make no sense to the user. However, conventional segmentation systems and methods cannot determine which segmentation path is better, as each phrase in both segmentation paths seems linguistically reasonable.

To address the above issue, embodiments of the disclosure provided improved systems and methods for segmenting a sentence.

SUMMARY

An aspect of the disclosure is directed to a method for segmenting a sentence. The method may include identifying, by a processor, a first phrase in the sentence associated with a first segmentation path; determining, by the processor, a first group of derivative phrases semantically associated with the first phrase; determining, by the processor, a first evaluation score based on modified sentences generated by replacing the first phrase with the respective derivative phrase in the first group; and segmenting the sentence based on the first evaluation score.

Another aspect of the disclosure is directed to a system for segmenting a sentence. The system may include a communication interface configured for receiving the sentence; a memory configured for storing the sentence and a language model; and a processor configured for identifying a first phrase in the sentence associated with a first segmentation path; determining a first group of derivative phrases semantically associated with the first phrase; determining a first evaluation score based on modified sentences generated by replacing the first phrase with the respective derivative phrase in the first group; and segmenting the sentence based on the first evaluation score.

Yet another aspect of the disclosure is directed to a non-transitory computer-readable medium that stores a set of instructions, when executed by at least one processor of a segmentation device, cause the segmentation device to perform a method for segmenting a sentence. The method may include identifying a first phrase in the sentence associated with a first segmentation path; determining a first group of derivative phrases semantically associated with the first phrase; determining a first evaluation score based on modified sentences generated by replacing the first phrase with the respective derivative phrase in the first group; and segmenting the sentence based on the first evaluation score.

It is to be understood that both the foregoing general description and the following detailed description are exemplary and explanatory only and are not restrictive of the invention, as claimed.

DETAILED DESCRIPTION

Reference will now be made in detail to the exemplary embodiments, examples of which are illustrated in the accompanying drawings. Wherever possible, the same reference numbers will be used throughout the drawings to refer to the same or like parts.

Figure 1:
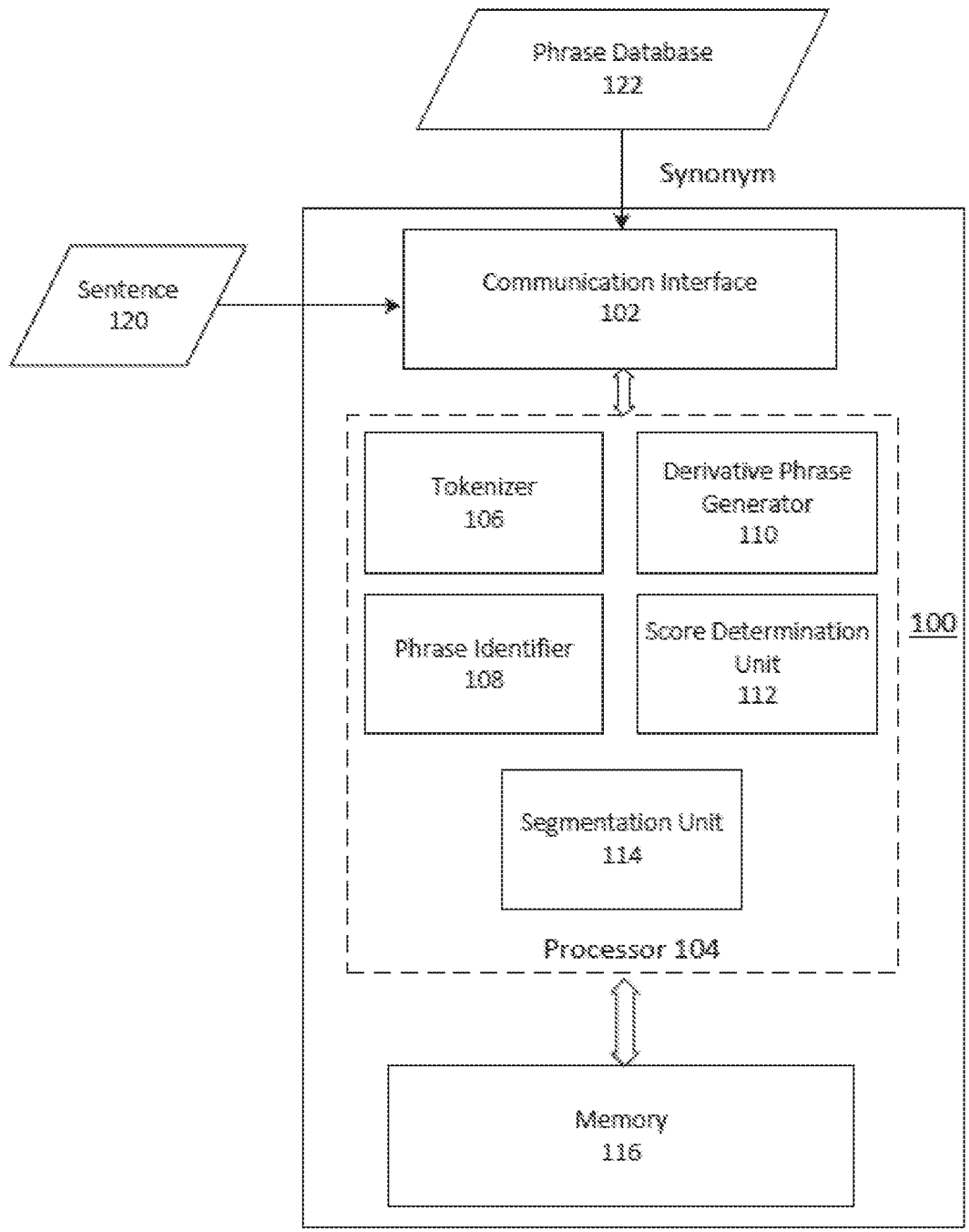
FIG. 1 is a block diagram of an exemplary system for segmenting a sentence, according to some embodiments of the disclosure.

FIG. 1 is a block diagram of an exemplary system 100 for segmenting a sentence, according to some embodiments of the disclosure.

System 100 may be a general server or a proprietary device for processing text information in a sentence. As shown in FIG. 1, system 100 may include a communication interface 102, a processor 104, and a memory 116. Processor 104 may further include multiple functional modules, such as a tokenizer 106, a phrase identifier 108, a derivative phrase generator 110, a score determination unit 112, and a segmentation unit 114. These modules (and any corresponding sub-modules or sub-units) can be functional hardware units (e.g., portions of an integrated circuit) of processor 104 designed for use with other components or a part of a program. The program may be stored on a computer-readable medium, and when executed by processor 104, it may perform one or more functions. Although FIG. 1 shows units 106-114 all within one processor 104, it is contemplated that these units may be distributed among multiple processors located near or remotely with each other. System 100 may be implemented in the cloud, or a separate computer/server.

Communication interface 102 may be configured to receive one or more sentences 120. Memory 116 may be configured to store the one or more sentences. Memory 116 may be implemented as any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, or a magnetic or optical disk.

Consistent with embodiments of the disclosure, processor 104 may identify a first phrase in the sentence received by communication interface 102. The first phrase is associated with a first segmentation path.

For example, tokenizer 106 may segment a sentence in one or more segmentation paths. As described with Example I, "The man over there is watching TV" may be segmented as a first segmentation path of "The man/ over/ there is/ watching TV" or a second segmentation path of "The man/ over there/ is/ watching TV." A first phrase "there is" is associated with the first segmentation path and a second phrase "over there" is associated with the second segmentation path. Phases "there is" and "over there" may be identified by comparing the first and second segmentation paths and locating differences between the segmentation paths. With reference to Example I, phrase identifier 108 may identify that the segments "over/ there is" and "over there/ is" are not identical by comparing the first and second segmentation paths. Then phrase identifier 108 may further identify "there is" as a first phrase associated with the first segmentation path and "over there" as a second phrase associated with the second segmentation path. It is contemplated that the first and second segments are different segments on a same part of the sentence. Therefore, the first and second phrases has at least one overlapping word (e.g., "there").

Derivative phrase generator 110 may then determine a first group of derivative phrases semantically associated with the first phrase. The derivative phrases may be determined based on semantic vectors between the first phrase and candidate phrases. The candidate phrases may be pre-stored in a phrase database, and each phrase in the database may be compared with the first phrase based on the semantic vectors. The semantic vector is an algebraic model for representing text documents (e.g., a phrase) as vectors. Generally, the difference between two semantic vectors associated with phrases may be represented by a cosine distance between the two semantic vectors. In some embodiments, the first group of derivative phrases may include synonyms of the first phrase. As shown in FIG. 1, communication interface 102 may be further configured to retrieve from a phrase database 122 synonyms corresponding to the phrases. For example, the first phrase "there is" may have several synonyms, such as "there are", "here is", "exist", "have", "has", or the like. In some embodiments, processor 104 may further determine a second group of derivative phrases semantically associated with the second phrase. The second group of derivative phrases associated with the second phrase "over there" may have synonyms, such as "there", "over here", or the like.

Given the first group of derivative phrases, score determination unit 112 may replace the first phrase with the respective derivative phrases in the first group, and determine a first evaluation score based on the modified sentences. For example, the sentence "The man/ over/ there is/ watching TV" may be modified by replacing the first phrase "there is" with the synonyms of "there are", "here is", "exist", "have", "has", or the like. Therefore, a plurality of modified sentences may be generated, including "The man/ over/ there are/ watching TV", "The man/ over/ here is/ watching TV", "The man/ over/ exist/ watching TV", "The man/ over/ have/ watching TV", "The man/ over/ has/ watching TV", or the like. In some embodiments, a language model score may be determined for each of the modified sentences using a language model, and the language model scores may be averaged to derive the first evaluation score. The language model can evaluate a segmentation path according to natural language rules. In some embodiments, the modified sentences "The man/ over/ there are/ watching TV", "The man/ over/here is/ watching TV", "The man/ over/ exist/ watching TV", "The man/ over/ have/ watching TV", "The man/ over/ has/ watching TV" may be respectively evaluated as 47 points, 68 points, 35 points, 33 points, and 42 points. Accordingly, the first evaluation score may be an average of the above scores, i.e., 45 points. As an example, for the modified sentence "The man/ over/ there are/ watching TV", the language model may determine that a singular subject going with a plural verb does not comply with the natural language rules, and therefore evaluate the modified sentence with a low score. It is contemplated that, whether a low score indicates a segmentation path as being improper or proper is not restrictive.

The original sentence including the first phrase may also be evaluated by the language model to generate a first base score. For example, the original sentence "The man/ over/ there is/ watching TV" may be evaluated as 68 points, which is considered as the first base score.

Similarly, score determination unit 112 may replace the second phrase (e.g., "over there") with the respective derivative phrases in the second group, and determine a second evaluation score based on the modified sentences. For example, a second evaluation score may be determined as 67 points and a second base score may be determined as 69 points.

The language model may be trained for a designated language, such as English, Chinese, Japanese, or the like. For sentences in Example I described above, an English language model may be used. The language model may be a general model pre-stored in memory 116, or trained for a specific area (e.g., novel, legal, navigation, or the like) by, for example, machine learning.

It contemplated that, when a phrase of a sentence within a proper segmentation path is modified with a synonym of the phrase, the modified sentence should still be able to deliver similar meanings and follow natural language rules. That is, when the language model evaluates the segmentation paths based on the original sentence and modified sentence, the language model scores based on the original sentence and the modified sentence should be close. On the other hand, when a phrase within an improper segmentation path is replaced with a synonym of the phrase, the modified sentences may have drastically different meanings or even does not meet natural language rules. That is, a difference between the language model scores based on the original sentence and the modified sentence may be magnified, so that processor 104 may determine the segmentation path is not proper. In some embodiments, a threshold may be pre-determined, such as 5 points. When the difference is greater than or equal to the threshold, the corresponding segmentation path may be determined as an improper segmentation path. It is contemplated that, the pre-determined difference may be different for different language models.

Segmentation unit 114 may further segment the sentence based on the evaluation score (e.g., the first and/or second evaluation score). For example, according to the first segmentation path, a difference between the first base score (e.g., 68 points) and the first evaluation score (e.g., 45 points) may be determined. The difference is 68−45=23 points, which is greater than the threshold (e.g., 5 points). Therefore, processor 104 may determine that the first segmentation path is an improper segmentation path. On the other hand, according to the second segmentation path, a difference between the second base score (e.g., 69 points) and the second evaluation score (e.g., 67 points) may be determined. The difference is 69−67=2 points, which is less than the threshold (e.g., 5 points). Therefore, segmentation unit 114 may determine that the second segmentation path is a proper segmentation path, and segment the sentence according to the second segmentation path.

As discuss above, the first base score (e.g., 68) corresponding to the first segmentation path and the second base score (e.g., 69) corresponding to the second segmentation path may be close, and selecting one segmentation path over another based on these base scores may sometimes cause errors. That is, a base score of 69 does not necessarily indicate that the corresponding segmentation path is better than one that has a base score of 68. However, by replacing the identified phrases in the first and second segmentation paths with synonyms, the difference between the first and second segmentation paths may be magnified so that segmentation unit 114 may more accurately select one of the segmentation paths based on the evaluation scores associated with respective segmentation paths.

Consistent with embodiments of the disclosure, segmentation unit 114 may segment the sentence based on a difference between the first evaluation score and the second evaluation score. For example, as described above, the first and second evaluation scores are 45 points and 67 points, respectively. Therefore, segmentation unit 114 may select one of the first and second segmentation paths that has the higher evaluation score (e.g., the second segmentation path), and segment the sentence according to the selected segmentation path.

It is contemplated that, all the scores and threshold described above are merely illustrative, and may be modified if necessary.

Figure 2:
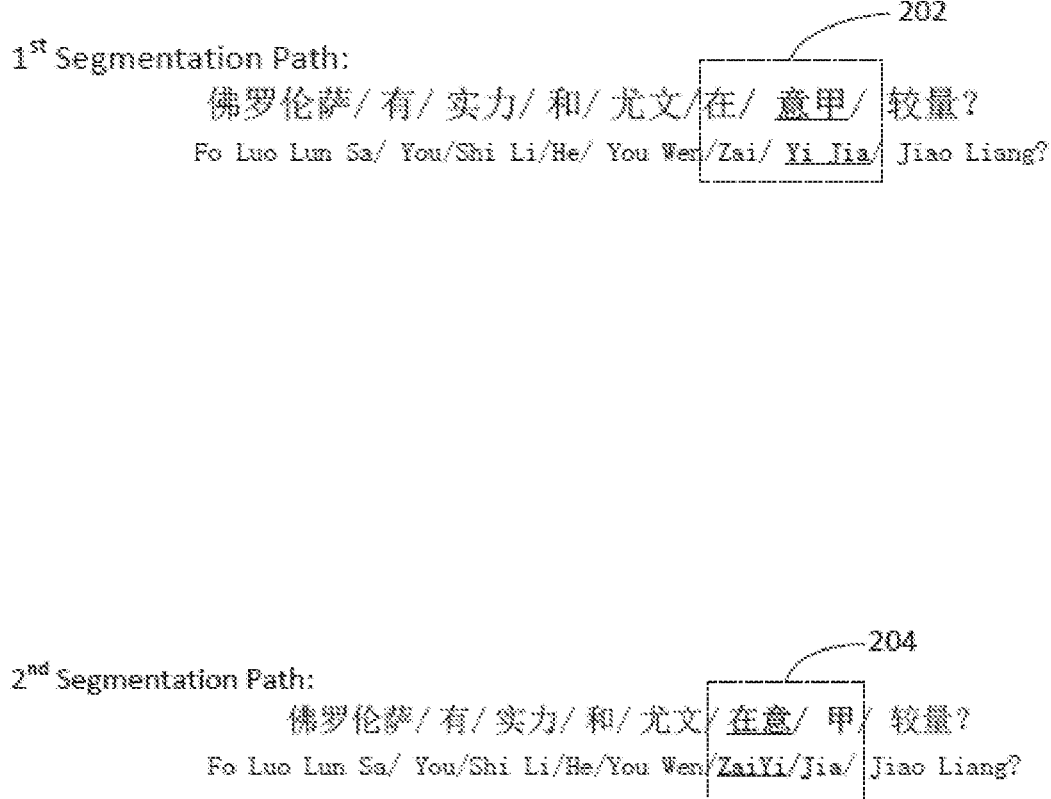
FIG. 2 illustrates two exemplary segmentation paths of a Chinese sentence, according to some embodiments of the disclosure.

Besides Example I in English, system 100 may also process a sentence of text in another language, such as Chinese. FIG. 2 further illustrates two exemplary segmentation paths of a Chinese sentence, according to some embodiments of the disclosure. The Chinese sentence means that Associazione Calcio Fiorentina has the ability to compete with Juventus Football Club in Italian Serie A League. Pin'yin spelling is marked for each Chinese character under the original Chinese sentence.

As shown in FIG. 2, in Example II, the Chinese sentence may be segmented according to first and second segmentation paths. The first and second segmentation paths may be compared by tokenizer 106 to identify that segment 202 and segment 204 are different. Then phrase identifier 108 may identify the phrase corresponding to "Yi Jia" in first segmentation path as a first phrase associated with the first segmentation path, and the phrase "Yi Jia" means "Italian Serie A League" in Chinese. Phrase identifier 108 may also identify the phrase corresponding to "Zai Yi" in the second segmentation path, and the phrase "Zai Yi" means "care for", "mind", or the like. It can be noticed that, the phrase "Yi Jia" and the phrase "Zai Yi" have a same Chinese character "Yi" in common.

Derivative phrase generator 110 may determine a first group and a second group of derivative phrases semantically associated with the first phrase and the second phrase, respectively. For example, the derivative phrases semantically associated with the first phrase "Yi Jia" may include "Primera División de España," "Premie League," "German Bundesliga," or the like. And the derivative phrases semantically associated with the second phrase "Zai Yi" may include "care for," "mind," "care about," or the like.

By replacing the first and second phrases with the corresponding derivative phrases respectively, modified sentences may be generated. And score determination unit 112 may then evaluate the first and second segmentation paths based on the original sentence and the modified sentences using a language model for Chinese. For example, the first and second segmentation paths based on the original sentence may be scored as 58.342 and 59.081 respectively, and the first and second segmentation paths based on the modified sentences may be scored as 58.561 and 34.952.

Based on the evaluation scores, segmentation unit 114 may select the first segmentation path having a higher evaluation score (e.g., 58.561 as opposed to 34.952), and segment the sentence accordingly. Note in this example, selecting the segmentation path based on the base scores would have resulted in an error, as the second segmentation path actually has a slightly higher base score.

The above-described system 100 may magnify (and sometimes, reverse) the difference between two or more segmentation paths by replacing an identified phrase with synonyms and select a proper path for segmenting the sentence, when the language model cannot distinguish them.

Figure 3:
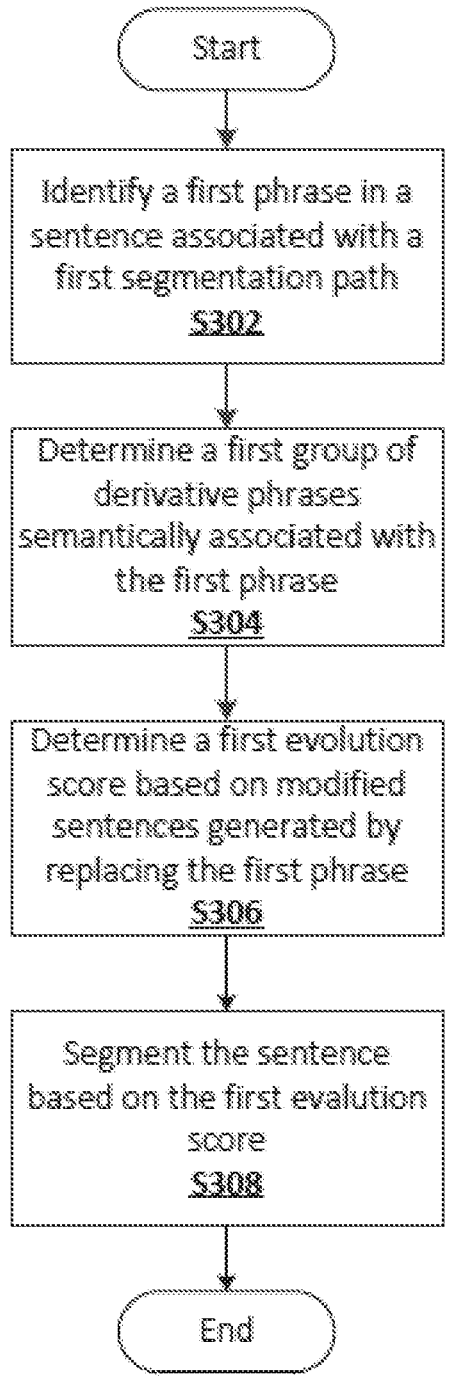
FIG. 3 is a flowchart of an exemplary method for segmenting a sentence, according to some embodiments of the disclosure.

Another aspect of the disclosure is directed to a method for segmenting a sentence. FIG. 3 is a flowchart of an exemplary method 300 for segmenting a sentence, according to some embodiments of the disclosure. For example, method 300 may be implemented by a segmentation device, and may include steps S302-S308.

In step S302, the segmentation device may identify a first phrase in the sentence associated with a first segmentation path. In some embodiments, the segmentation device may generate at least two segmentation paths of the sentence. Each of the segmentation path may include a plurality of segments. The segmentation device may compare the plurality of segments and identify a segment in a first segmentation path that is different from a corresponding segment in other segmentation paths. Similarly, the segmentation device may identify a segment in a second segmentation path. Further, the segmentation device may identify the first phrase in the sentence associated with the first segmentation path, and the second phrase in the sentence associated with the second segmentation path. As the first and second segmentation paths are different segmentation paths on a same sentence or a same part of the sentence, the first and second phrases may have at least one overlapping word.

In step S304, the segmentation device may determine a first group of derivative phrases semantically associated with the first phrase. The derivative phrases may be determined based on semantic vectors between the first phrase and candidate phrases. The candidate phrases may be pre-stored in a phrases database, and each phrase in the database may be compared with the first phrase based on the semantic vectors. In some embodiments, the first group of derivative phrases may include synonyms of the first phrase. Similarly, the segmentation device may determine a second group of derivative phrases semantically associated with the second phrase.

In step S306, the segmentation device may determine a first evaluation score based on the modified sentences generated by replacing the first phrase with the respective derivative phrases in the first group. A language model score may be determined for each of the modified sentences using a language model, and the language model scores may be averaged to derive the first evaluation score. The language model may evaluate a segmentation path according to natural language rules. The segmentation device may further determine a second evaluation score based on the modified sentences generated by replacing the second phrase with the respective derivative phrases in the second group. A first base score and a second base score may be also determined based the sentence. For example, the first and second segments of the sentence may be scored by the language model to generate the first and second base scores. It is contemplated that, an averaged score is merely an example for evaluating the segmentation paths. The individual scores may be manipulated or combined in any suitable ways to derive the evaluation score. For example, instead of a straight average of the individual scores, the evaluation score may be a weighted average of the individual scores, and the weights may correspond to how close the respective synonyms are to the phrase. As another example, a variance of the individual language model scores for the modified sentences may be used to determine whether the language model scores vary significantly. If the language model scores vary significantly, it may indicate the corresponding segmentation path is not proper.

In step S308, the segmentation device may segment the sentence based on the first evaluation score. In one embodiment, the segmentation device may compare the first evaluation score with the first base score, and segment the sentence according to the first segmentation path when the difference between the first base score and the first evaluation score is less than a threshold. As discussed above, when a sentence is segmented properly, the evaluation score based on modified sentences should be close to the base score based on the original sentence. In another embodiment, the segmentation device may segment the sentence based on a difference between the first evaluation score and the second evaluation score. For example, the segmentation device may select one of the first and second segmentation paths that has the higher evaluation score, and segment the sentence according to the selected segmentation path.

Yet another aspect of the disclosure is directed to a non-transitory computer-readable medium storing instructions which, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

It will be apparent to those skilled in the art that various modifications and variations can be made to the disclosed segmentation system and related methods. Other embodiments will be apparent to those skilled in the art from consideration of the specification and practice of the disclosed system and related methods. Although the embodiments are described for two segmentation paths as an example, the described segmentation system and method can be applied to more than two segmentation paths.

It is intended that the specification and examples be considered as exemplary only, with a true scope being indicated by the following claims and their equivalents.

What is claimed is:

1. A computer-implemented method for segmenting a sentence, comprising:
   identifying a first phrase in the sentence associated with a first segmentation path;
   determining a first group of derivative phrases semantically associated with the first phrase;
   determining a first evaluation score based on modified sentences generated by replacing the first phrase with the respective derivative phrase in the first group;
   identifying a second phrase in the sentence associated with a second segmentation path;
   determining a second group of derivative phrases semantically associated with the second phrase;
   determining a second evaluation score based on score based on modified sentences generated by replacing the second phrase with the respective derivative phrase in the second group; and
   segmenting the sentence based on a difference between the first evaluation score and the second evaluation score.

2. The method of claim 1, wherein the determining the first evaluation score includes:
   determining a language model score for each modified sentence; and
   averaging the language model scores to derive the first evaluation score.

3. The method of claim 2, wherein the language model score is generated using a language model according to natural language rules.

4. The method of claim 1, further comprising:
   determining a first base score based on the sentence including the first phrase; and
   segmenting the sentence based on a difference between the first base score and the first evaluation score, wherein the sentence is segmented according to the first segmentation path when the difference between the first base score and the first evaluation score is less than a threshold.

5. The method of claim 1, wherein the second phrase has at least one overlapping word with the first phrase.

6. The method claim 1, further comprising:
   identifying the first phrase and the second phrase based on a difference between the first segmentation path and the second segmentation path.

7. The method claim 1, further comprising:
   selecting one of the first and second segmentation paths that has the higher evaluation score; and
   segmenting the sentence according to the selected segmentation path.

8. The method of claim 1, wherein the first group of derivative phrases are determined based on semantic vectors between the first phrase and candidate phrases.

9. A system for segmenting a sentence, comprising:
   a communication interface configured for receiving the sentence;
   a memory configured for storing the sentence and a language model; and
   a processor configured for
      identifying a first phrase in the sentence associated with a first segmentation path;
      determining a first group of derivative phrases semantically associated with the first phrase;
      determining a first evaluation score based on modified sentences generated by replacing the first phrase with the respective derivative phrase in the first group;

identifying a second phrase in the sentence associated with a second segmentation path;

determining a second group of derivative phrases semantically associated with the second phrase;

determining a second evaluation score based on score based on modified sentences generated by replacing the second phrase with the respective derivative phrase in the second group; and segmenting the sentence based on a difference between the first evaluation score and the second evaluation score.

10. The system of claim 9, wherein the processor is further configured for:

determining a language model score for each modified sentence; and averaging the language model scores to derive the first evaluation score.

11. The system of claim 10, wherein the language model score is generated using a language model according to natural language rules.

12. The system of claim 9, wherein the processor is further configured for:

determining a first base score based on the sentence including the first phrase; and segmenting the sentence based on a difference between the first base score and the first evaluation score, wherein the sentence is segmented according to the first segmentation path when the difference between the first base score and the first evaluation score is less than a threshold.

13. The system of claim 9, wherein the second phrase has at least one overlapping word with the first phrase.

14. The system claim 9, wherein the processor is further configured for:

identifying the first phrase and the second phrase based on a difference between the first segmentation path and the second segmentation path.

15. The system claim 9, wherein the processor is further configured for:

selecting one of the first and second segmentation paths that has the higher evaluation score; and segmenting the sentence according to the selected segmentation path.

16. A non-transitory computer-readable medium that stores a set of instructions, when executed by at least one processor of a segmentation device, cause the segmentation device to perform a method for segmenting a sentence, the method comprising:

identifying a first phrase in the sentence associated with a first segmentation path;

determining a first group of derivative phrases semantically associated with the first phrase;

determining a first evaluation score based on modified sentences generated by replacing the first phrase with the respective derivative phrase in the first group;

identifying a second phrase in the sentence associated with a second segmentation path;

determining a second group of derivative phrases semantically associated with the second phrase;

determining a second evaluation score based on score based on modified sentences generated by replacing the second phrase with the respective derivative phrase in the second group; and segmenting the sentence based on a difference between the first evaluation score and the second evaluation score.

* * * * *

UNITED STATES PATENT AND TRADEMARK OFFICE
CERTIFICATE OF CORRECTION

PATENT NO. : 11,132,506 B2  
APPLICATION NO. : 16/749956  
DATED : September 28, 2021  
INVENTOR(S) : Jie Bai et al.

Page 1 of 1

It is certified that error appears in the above-identified patent and that said Letters Patent is hereby corrected as shown below:

In the Claims

Claim 6, Column 8, Line 43, "The method claim 1" should read --The method of claim 1--.

Claim 7, Column 8, Line 47, "The method claim 1" should read --The method of claim 1--.

Claim 14, Column 9, Line 33, "The system claim 9" should read --The system of claim 9--.

Claim 15, Column 10, Line 4, "The system claim 9" should read --The system of claim 9--.

Signed and Sealed this  
Ninth Day of November, 2021

Drew Hirshfeld  
*Performing the Functions and Duties of the*  
*Under Secretary of Commerce for Intellectual Property and*  
*Director of the United States Patent and Trademark Office*